E. P. ARPIN.
STEERING DEVICE.
APPLICATION FILED APR. 18, 1919.
1,311,032.
Patented July 22, 1919.
2 SHEETS—SHEET 2.
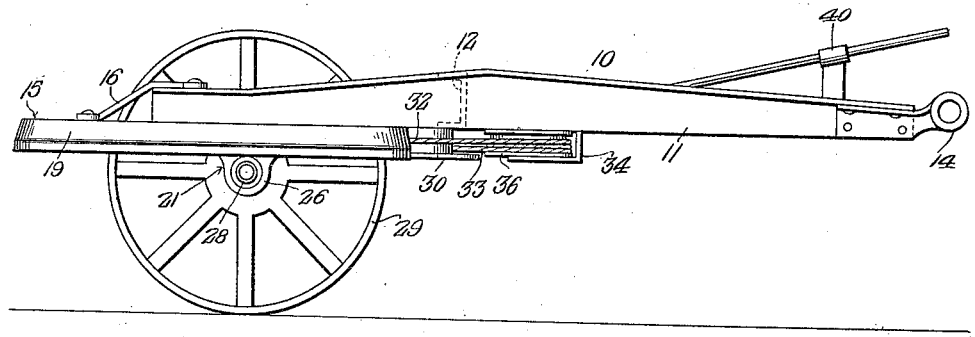
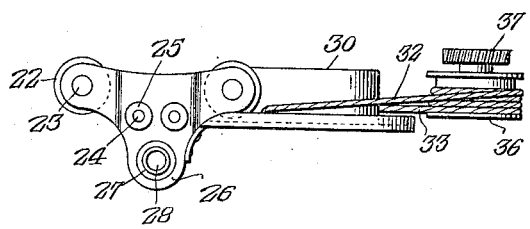
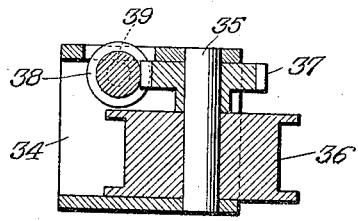

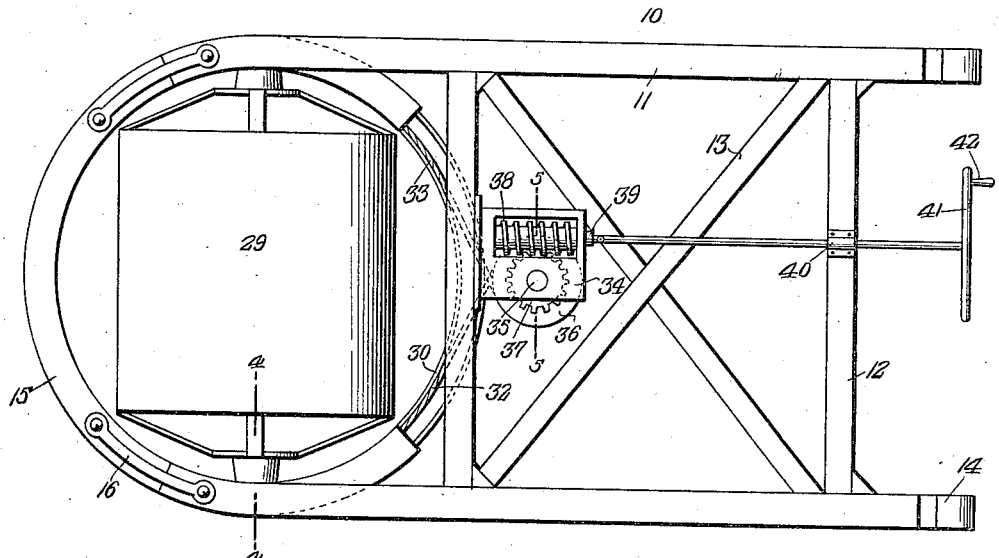

UNITED STATES PATENT OFFICE.

EDMUND P. ARPIN, OF THE UNITED STATES ARMY.

STEERING DEVICE.

1,311,032.  Specification of Letters Patent.  Patented July 22, 1919.

Application filed April 18, 1919. Serial No. 291,017.

*To all whom it may concern:*

Be it known that I, EDMUND P. ARPIN, a citizen of the United States, and a member of the Army of the United States, have invented new and useful Improvements in Steering Devices, of which the following is a specification.

This invention has reference to improvements in means for steering the front wheels of tractors, etc.

The object of the invention is to provide a device of this character which will facilitate the control of the front wheel; afford a short turning radius, and relieve shocks from the main frame of a tractor or other power driven vehicle.

Other objects and advantages will appear as the nature of the invention is better understood, reference being had to the accompanying drawings, in which:

Figure 1 is a plan view of the improvement.

Fig. 2 is a side elevation thereof.

Fig. 3 is a top plan view of the yoke and drum illustrating the flexible connection therebetween and also the elements carried by the yoke, the shaft for the drum being in section.

Fig. 4 is a greatly enlarged sectional view approximately on the line 4—4 of Fig. 1.

Fig. 5 is a vertical transverse sectional view on an enlarged scale, and approximately on the line 5—5 of Fig. 1.

Fig. 6 is a side elevation of the device illustrated in Fig. 3, but also showing the worm wheel on the shaft of the drum.

In carrying out the invention, I employ a frame 10, comprising parallel side members 11, transverse members 12 connecting said sides, and angle brace members 13 arranged between the transverse members and the side members. The side members extend a suitable distance beyond the transverse members, and preferably the sides, at the rear of the frame 10 are provided with sleeves 14 which may receive the front axle of a vehicle, or the frame may be secured to the chassis of a power vehicle in other manners if desired.

The forward end of the side members 11 of the frame preferably extend beyond the front transverse or connecting member 12 a greater distance than does the rear portions of the said sides, and the referred to forward portions of the sides rest upon a circular track 15 and are secured to the said track. In addition to the ordinary securing means, such as bolts, rivets or the like, angle braces 16 are connected to the ends of the sides 11 and to the track 15 at the top of the said track.

The track has its inner face, at the side and bottom thereof, for the major portion of the said track open, the track presenting a flat top surface 17, inner angle flange or side 18, outer angle side or flange 19, the latter having a straight portion at the lower end thereof and the said straight portion being provided with an inturned flange 20. While I have referred to the track as circular the same may be less than a circle, but preferably the outer flange 19 at the rear of the track is, for a considerable distance cut away, the reason for which will presently be apparent.

The track 15 is designed to receive therein oppositely disposed carriages 21, each of which being preferably in the nature of a casting, circular in plan and having the ends thereof bifurcated. In the bifurcations are received rollers 22 journaled on shafts 23 received in the arms provided by the bifurcations. These rollers contact directly with the flat under face of the upper wall 17 of the track. The carriages have their sides concaved or rounded inwardly from the bifurcated ends thereof, and journaled on suitable shafts 24 in the concaved outer faces of the carriages are rollers 25, the same being comparatively small with respect to the rollers 22. The rollers 25 rest on the inturned wall or flange 20 of the track and prevent the track being raised above the bearing rollers 22. Each of the carriages 21 is centrally provided with a depending rounded portion 26 having a central round opening 27 therethrough, and these openings provide bearings for the shaft 28 of the front wheel or roller 29 for the frame 10. The carriages 21, at the rear thereof are connected by a round flat member in the nature of a yoke 30, and secured to the rear of the respective carriages 21 are cables 32 and 33 respectively.

Secured upon the outer transverse connecting member 12 for the frame 10 is an inwardly extending track 34 which is approximately centrally provided with a horizontal opening therethrough, and passing through this opening, and journaled in suitable bearings in the upper and lower faces of the bracket is a shaft 35. On the lower portion of this shaft is secured a drum 36 around which the ends of the cables 32 and 33 are wound and secured. The shaft 30 also is provided with a worm wheel 37 disposed above the drum 36, the said worm wheel being engaged by a worm 38 secured upon a shaft 39 that is journaled in suitable bearing openings in the bracket 34 as well as in a bearing 40 on the rear transverse connecting member 12 of the frame. The outer end of the shaft 39 is provided with a hand wheel 41 having an operating handle 42, and by turning the wheel it will be obvious that the drum will be likewise turned so that the cables, being wound in opposite directions will cause the carriages to travel on the circular track, and consequently turn the guide wheel or roller 29 and properly direct the machine in an easy, active and expeditious manner.

The frame is preferably constructed of channel iron, and the device may be detachably connected with a tractor or rigidly secured thereto, and from the foregoing description, when taken in connection with the drawings, the simplicity of the construction and the advantages thereof, it is thought, will be apparent without further description.

Having thus described the invention, what is claimed as new is:—

1. In a device for the purpose set forth, a frame, a circular carriage secured at the front thereof having a partly open inner side and an inturned flange upon the lower edge of its outer side, a pair of oppositely disposed carriages arranged in the frame and having rollers thereon contacting with the under face of the track and in the path of contact with the inturned flange, a shaft journaled in said carriages, a steering wheel thereon, and means for imparting a simultaneous motion to the carriages to move the same on the track to bring the steering wheel to a desired angle with respect to the frame.

2. In a device for the purpose set forth, a frame, a circular track secured thereto comprising a member having a partly open inner side, a flange on the lower edge of its outer side and its said outer side partly open at the rear portion thereof, oppositely disposed carriages in the track having bearing rollers journaled thereon contacting with the under face of the track and having side rollers in the path of contact with the flange of the track, said carriages having central depending portions, a shaft journaled therein, a steering wheel secured on said shaft, a segmental yoke connecting the carriages, flexible elements secured to the carriages, a drum on which said elements are wound in reverse directions, and means for revolving the drum to turn the carriages on the track to bring the steering wheel at a desired angle with respect to the frame.

3. In a device for the purpose set forth, a frame having a circular track at the outer end thereof and having bearings on the inner end thereof, the track having its outer side provided with an inturned flange, oppositely disposed carriages in the track, rollers thereon bearing on the under face of the track and contacting with the flange of the said track, a yoke connecting said carriages, a shaft journaled in said carriages, a steering wheel secured thereon, flexible elements secured to the respective carriages, a drum having a shaft journaled on the frame around which the flexible elements are wound in opposite directions and secured to the said drum, a worm gear on the shaft, an operating shaft journaled on the frame, and a worm on said shaft meshing with the worm gear.

In testimony whereof I affix my signature.

EDMUND P. ARPIN.

Copies of this patent may be obtained for five cents each, by addressing the "Commissioner of Patents, Washington, D. C."